(12) United States Patent
Sinclair et al.

(10) Patent No.: US 7,475,112 B2
(45) Date of Patent: Jan. 6, 2009

(54) METHOD AND SYSTEM FOR PRESENTING A VIDEO CONFERENCE USING A THREE-DIMENSIONAL OBJECT

(75) Inventors: Andrew Sinclair, Redmond, WA (US); Timothy M. Moore, Bellevue, WA (US); Warren Vincent Barkley, Mill Creek, WA (US); Wei Zhong, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 167 days.

(21) Appl. No.: 11/073,417

(22) Filed: Mar. 4, 2005

(65) Prior Publication Data
US 2006/0200518 A1    Sep. 7, 2006

(51) Int. Cl.
G06F 15/16 (2006.01)
G06T 1/00 (2006.01)
G06T 15/00 (2006.01)

(52) U.S. Cl. .................. 709/204; 709/203; 709/205; 709/206; 709/207; 709/231; 345/418; 345/419

(58) Field of Classification Search .................. 345/437, 345/418–419; 709/203–207, 231
See application file for complete search history.

(56) References Cited

U.S. PATENT DOCUMENTS

| | | | | |
|---|---|---|---|---|
| 5,844,599 A | * | 12/1998 | Hildin | 348/14.1 |
| 5,963,215 A | * | 10/1999 | Rosenzweig | 345/649 |
| 6,850,265 B1 | * | 2/2005 | Strubbe et al. | 348/14.05 |
| 6,853,398 B2 | * | 2/2005 | Malzbender et al. | 348/14.09 |
| 7,081,915 B1 | * | 7/2006 | Hamilton | 348/14.08 |
| 7,216,305 B1 | * | 5/2007 | Jaeger | 715/849 |
| 2002/0023133 A1 | * | 2/2002 | Kato et al. | 709/205 |
| 2002/0038387 A1 | * | 3/2002 | Fuiks et al. | 709/313 |
| 2002/0116545 A1 | * | 8/2002 | Mandato et al. | 709/328 |
| 2003/0014752 A1 | * | 1/2003 | Zaslavsky et al. | 725/40 |
| 2003/0149724 A1 | * | 8/2003 | Chang | 709/204 |
| 2004/0008198 A1 | * | 1/2004 | Gildred | 345/419 |
| 2004/0008635 A1 | * | 1/2004 | Nelson et al. | 370/260 |
| 2004/0254982 A1 | * | 12/2004 | Hoffman et al. | 709/204 |

OTHER PUBLICATIONS

Spirit DSP Embedded Voice Experience, "VAD/AGC/CNG Algorithm Module" (2 pages) http://www.spiritdsp.com/vad_agc.html.
Nuntius, "Telephony Software—Voice over Packet Solutions," Wireline Communications Solutions (3 pages) http://www.nuntius.com/solutions12.html.

* cited by examiner

Primary Examiner—Nathan J Flynn
Assistant Examiner—Joshua Joo
(74) Attorney, Agent, or Firm—Perkins Coie LLP

(57) ABSTRACT

A presentation system receives streams of videos of a video conference and presents the videos on the faces of a three-dimensional object. The presentation system selects which video should be presented more prominently than the other videos. The presentation system generates an image of the three-dimensional object that represents a view location from which the selected video is prominently visible and videos of other conference participants are less prominently visible. The presentation system then displays the image to the conference participant.

11 Claims, 9 Drawing Sheets

METHOD AND SYSTEM FOR PRESENTING A VIDEO CONFERENCE USING A THREE-DIMENSIONAL OBJECT

TECHNICAL FIELD

The described technology relates generally to presenting videos of a video conference.

BACKGROUND

Video conferencing allows conference participants who are at different locations to participate in a conference. Typically, each conference participant has a computer-based video conferencing system that includes a video camera, a microphone, a display device, and a speaker. The video conferencing system of a conference participant captures the video and audio of that conference participant using the video camera and microphone and transmits the video and audio to the video conferencing systems of the other conference participants. When a video conferencing system receives the video and audio from the other conference participants, it presents the video on the display device and outputs the audio to the speaker. A video conferencing system may display each video in a different window on the display device. Thus, the conference participants can view the video and hear the audio of the other conference participants.

Most video conferencing systems simply tile the windows on the display device. For example, each window may be the same size and arranged in a left-to-right, top-to-bottom manner. Some video conferencing systems allow a conference participant to rearrange and resize the windows. For example, a conference participant may arrange the windows so that the video of the conference leader is in the center of the display and the videos of the other conference participants surround the video of the conference leader.

One video conferencing system displays the windows of the videos in a "perspective" view. This perspective view allows the video of one window to be displayed as the focal point and the videos of other windows to be displayed either on the periphery or as a minimal window. FIG. 1 is a diagram that illustrates the perspective view of a video conference. The video conferencing system displays four windows 101-104 on the display 100. Window 101 is displayed as the focal point of the video conference, windows 102 and 103 are displayed on the periphery, and window 104 is displayed as a minimal window. The video of window 101 may be of the conference leader and thus is shown as the focal point of the video conference. Windows 102 and 103 are shown on the periphery of the focal point to provide the illusion of a perspective view leading to the focal point.

Although the video conferencing systems allow a conference participant flexibility in arranging windows, the process of arranging the windows can be time-consuming. As a result, a conference participant will typically only arrange the windows at the beginning of a video conference. A conference participant may position the window of the conference leader in a prominent or primary location on the display and the windows of the other conference participants in a secondary location on the display. If, however, the conference leader is not the primary speaker at the conference, then the conference participant may need to focus on a window at a secondary location or rearrange the windows during the conference. It would be desirable to have a video conferencing system that would automatically and dynamically display prominently the video of the conference participant who is currently speaking. It would also be desirable to display the video of other conference participants who are not currently speaking less prominently.

SUMMARY

A method and system for presenting a video conference on a three-dimensional object is provided. A presentation system receives streams of videos of a video conference and presents the videos on the faces of a three-dimensional object. The presentation system selects which video should be presented more prominently than the other videos. The presentation system generates an image of the three-dimensional object that represents a view location from which the selected video is prominently visible and videos of other conference participants are less prominently visible. The presentation system then displays the image to the conference participant. The presentation system updates the image as additional video frames are received from the conference participants.

DETAILED DESCRIPTION

Figure 1:
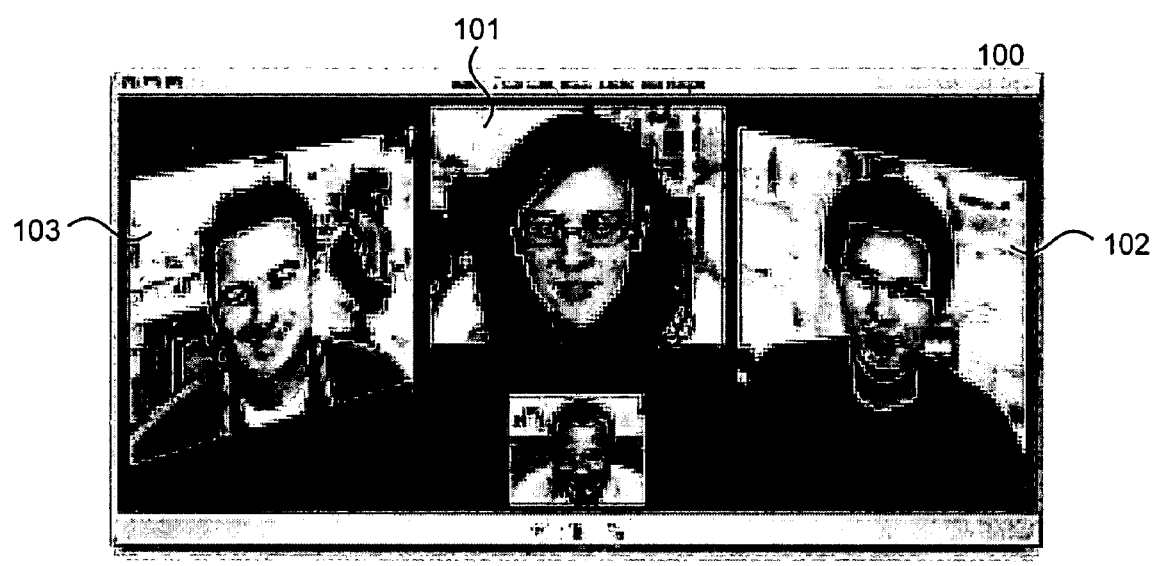
FIG. 1 is a diagram that illustrates the perspective view of a video conference.

A method and system for presenting a video conference on a three-dimensional object is provided. In one embodiment, the presentation system receives streams of videos of a video conference and presents the videos on the faces of a three-dimensional object. For example, if the three-dimensional object is a cube, then the presentation system may assign a video to each of the six faces of the cube. The presentation system then selects which video should be presented more prominently than the other videos. For example, the presentation system may select the video of the conference participant who is currently speaking to be displayed most prominently. The presentation system then generates an image of the three-dimensional object that represents a view location from which the selected video is prominently visible and videos of other conference participants are less prominently visible. The presentation system then displays the image to the conference participant. To the conference participant, the videos of the other participants appear to be displayed on the faces of the three-dimensional object. The presentation system updates the image as additional video frames are received from the conference participants. As the video conference proceeds, the presentation system may determine that the video of another conference participant should now be displayed more prominently. In such a case, the presentation system generates an image of the three-dimensional object from a new view location in which the video of the other conference participant is prominently visible. In this way, the presentation system can dynamically determine which video should be prominently displayed on the face of the three-dimensional object.

In one embodiment, the presentation system may use various techniques to determine which video should be prominently displayed. As described above, the presentation system may identify which conference participant is currently speaking and display the video of that conference participant prominently. The presentation system may analyze the audio data associated with the conference to identify which conference participant is currently speaking using voice detection technology. Alternatively, the presentation system may analyze the content of the video to identify which conference participant is currently speaking. The presentation system may also allow a conference participant to select the conference participant whose video is to be prominently displayed. For example, the conference leader may select the conference participant whose video is to be prominently displayed to each conference participant. Alternatively, each conference participant can select whose video is to be displayed prominently to them. The presentation system may analyze the video and select a conference participant who is engaging in a certain activity (e.g., pointing to a chart). The presentation system may alternatively sequence through the conference participants displaying their videos prominently for a certain time. The presentation system may also identify when multiple conference participants should have their videos displayed prominently. For example, if two conference participants are engaged in a dialog, then the presentation system may determine that the video of both conference participants should be prominently displayed. In such a case, the presentation system may select a view location from which to view the three-dimensional object such that the videos of both conference participants are prominently displayed. For example, if the three-dimensional object is a cube, then the presentation system may assign the two videos to adjacent faces of the cube and select a view location in which the edge of the adjacent faces is in the center of the image.

In one embodiment, the presentation system may be implemented on a video conferencing server, such as a multipoint control unit ("MCU"), that serves as a hub for the video conference. The video of each conference participant is transmitted by the conference participant's video conferencing system to the video conferencing server. The video conferencing server then assigns the videos to the faces of a three-dimensional object, identifies the video that should be displayed most prominently, generates an image of the three-dimensional object in which the identified video is displayed prominently, and distributes the image to the video conferencing systems of the conference participants. The presentation system at the video conferencing server may automatically identify which video is to be displayed prominently or may receive input from a conference leader as to which video should be displayed prominently.

In an alternate embodiment, the presentation system is implemented at the video conferencing systems of the conference participants that are connected on a peer-to-peer basis. In a peer-to-peer conference, the video conferencing system of each conference participant is connected to the video conferencing systems of each other conference participant. The video conferencing systems are connected in what is referred to as a "mesh." When the presentation system of such a video conferencing system receives the videos of the other conference participants, the presentation system assigns the videos to the faces of a three-dimensional object, identifies a video that should be displayed prominently, generates an image from a view location at which the selected video is prominently visible, and displays the image to the conference participant. The presentation system at such a video conferencing system may dynamically and automatically identify which video should be displayed prominently. Alternatively, the presentation system selects the video to display prominently based on input from the conference participant or the conference leader. The presentation system may allow a conference participant to specify a view angle at which to view the video that is to be displayed most prominently. For example, a conference participant may select a view angle from plus or minus 0 to 45 degrees in the horizontal and vertical directions. In the case of a cube, view angles of 0 in the horizontal and vertical direction means that only that face of the cube would be visible. The presentation system then displays the three-dimensional object from a view location in that direction.

Figure 2:
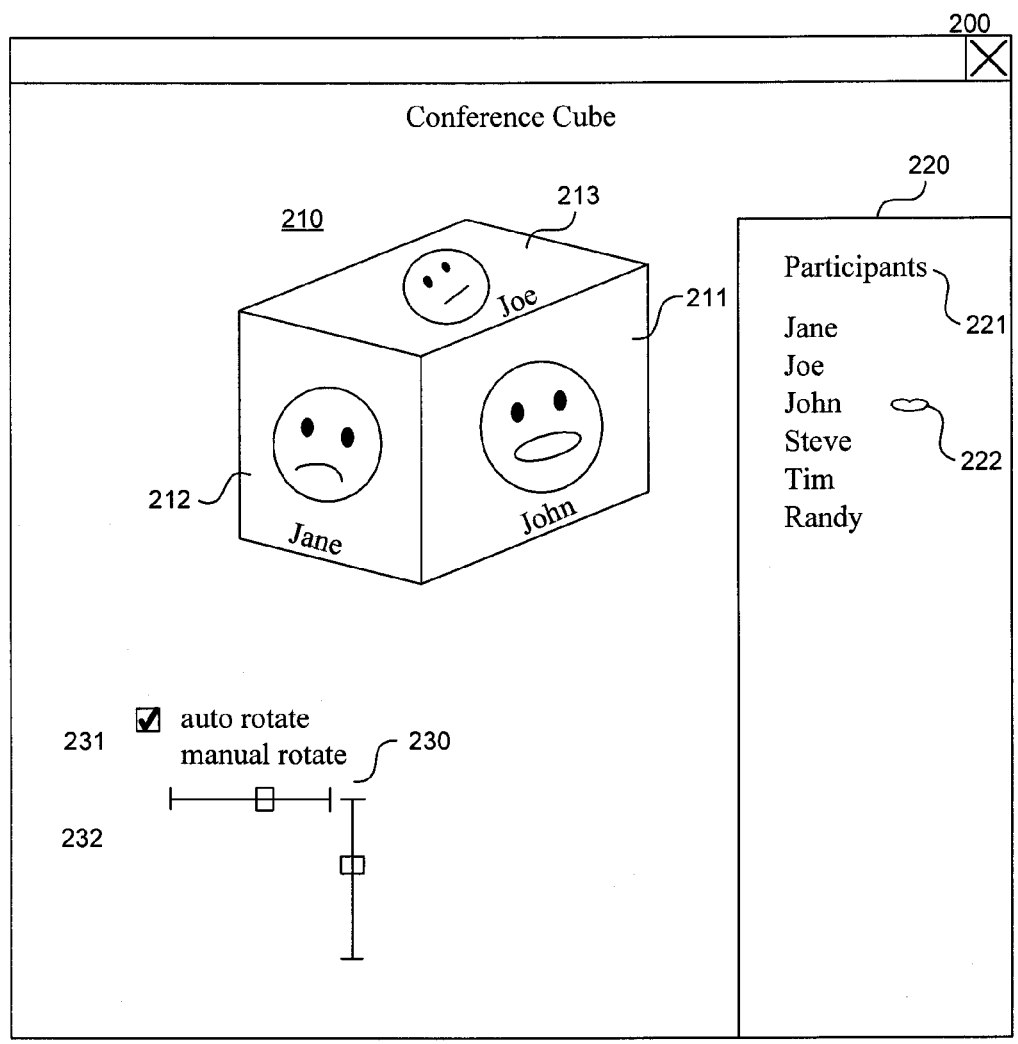
FIG. 2 is a display page that illustrates the presentation of a video conference using a cube in which the video of one conference participant is displayed prominently in one embodiment.

FIG. 2 is a display page that illustrates the presentation of a video conference using a cube in which the video of one conference participant is displayed prominently in one embodiment. A display page 200 includes a conference cube 210, a participants window 220, and a rotate selection area 230. The conference cube has a video displayed on faces 211, 212, and 213. In this example, the videos associated with the conference participants John, Jane, and Joe are displayed on faces 211, 212, and 213, respectively. John's video is displayed more prominently than the video of Jane or Joe because John is currently speaking. The participants window displays a list 221 of the names of the participants. In this example, the participants are Jane, Joe, John, Steve, Tim, and Randy. The lips 222 to the right of John's name indicate that John is currently speaking. The presentation system detected that John is currently speaking by analyzing the audio associated with the video conference. One skilled in the art will appreciate that various well-known voice activity detection algorithms may be used, such as those provided by Nuntius Systems and Spirit Corporation. The rotate selection area includes an auto rotate checkbox 231 and manual rotate sliders 232. In this example, the conference participant has selected the auto rotate checkbox so the presentation system automatically rotates the conference cube so that the video of the conference participant that is currently speaking is prominently displayed. The conference participant can use the sliders to rotate the cube to view the video of the conference participants more or less prominently. In this example, the videos of Steve, Tim, and Randy are assigned to faces of the conference cube that are not currently visible.

Figure 3:
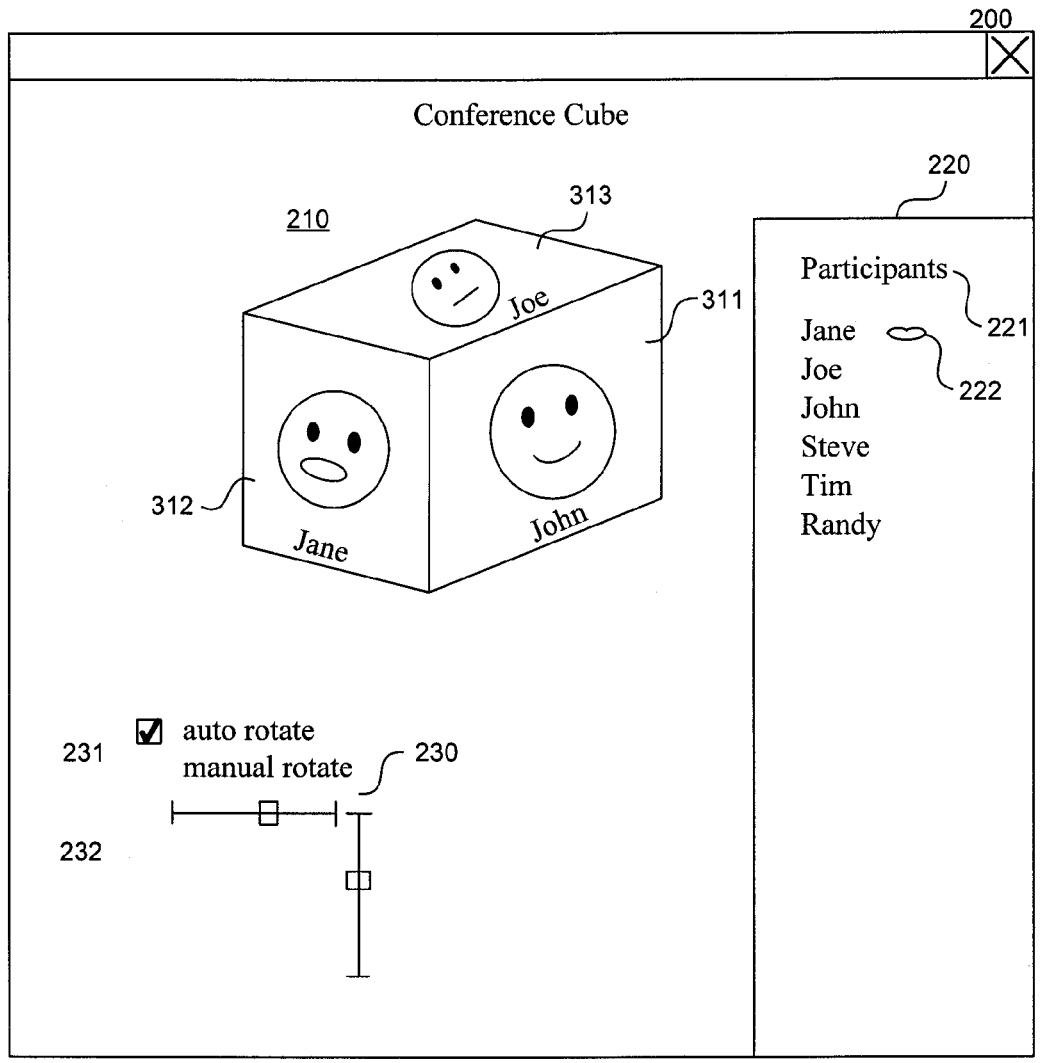
FIG. 3 is a display page that illustrates the presentation of a video conference using a cube in which the video of a different conference participant is displayed prominently in one embodiment.

FIG. 3 is a display page that illustrates the presentation of a video conference using a cube in which the video of a different conference participant is displayed prominently in one embodiment. A display page 200 includes a conference cube 210 and a participants window 220. The conference cube has a video displayed on faces 311, 312, and 313. The conference cube corresponds to the conference cube of FIG. 1, except that the video of Jane is prominently displayed, rather than the video of John. The presentation system automatically rotated the conference when it detected that Jane, as indicated by the lips 222 to the right of her name in the participants list 221, is currently speaking. The presentation system upon detecting that Jane was the new current speaker may have rotated the conference cube by incrementally changing the view location from that in which the John's video was prominently displayed to a view location in which Jane's video is prominently displayed. The presentation system may need to reassign videos to the faces of the cube so that videos of certain conference participants are always visible. For example, the presentation system may want to have visible, in addition to the video of the conference participant that is currently speaking, the videos of the two other conference participants who are most active in the conference. Since the conference participants who are most active may change over time, the presentation system may need to dynamically change the assignments of videos to faces. Alternatively, the presentation system may assign the video of the conference leader to a face so that the video of the conference leader is always visible. In one embodiment, the presentation system may apply a hysteresis effect so that the cube does not start rotating immediately when a new conference participant starts speaking. For example, if a conference participant interrupts a conference participant who is currently speaking to say "I agree," the presentation system will not rotate the cube so that the video of the interrupting conference participant is prominently displayed. Conference participants may find it distracting if the presentation system rapidly rotates the cube for very short utterances of a conference participant.

Figure 4:
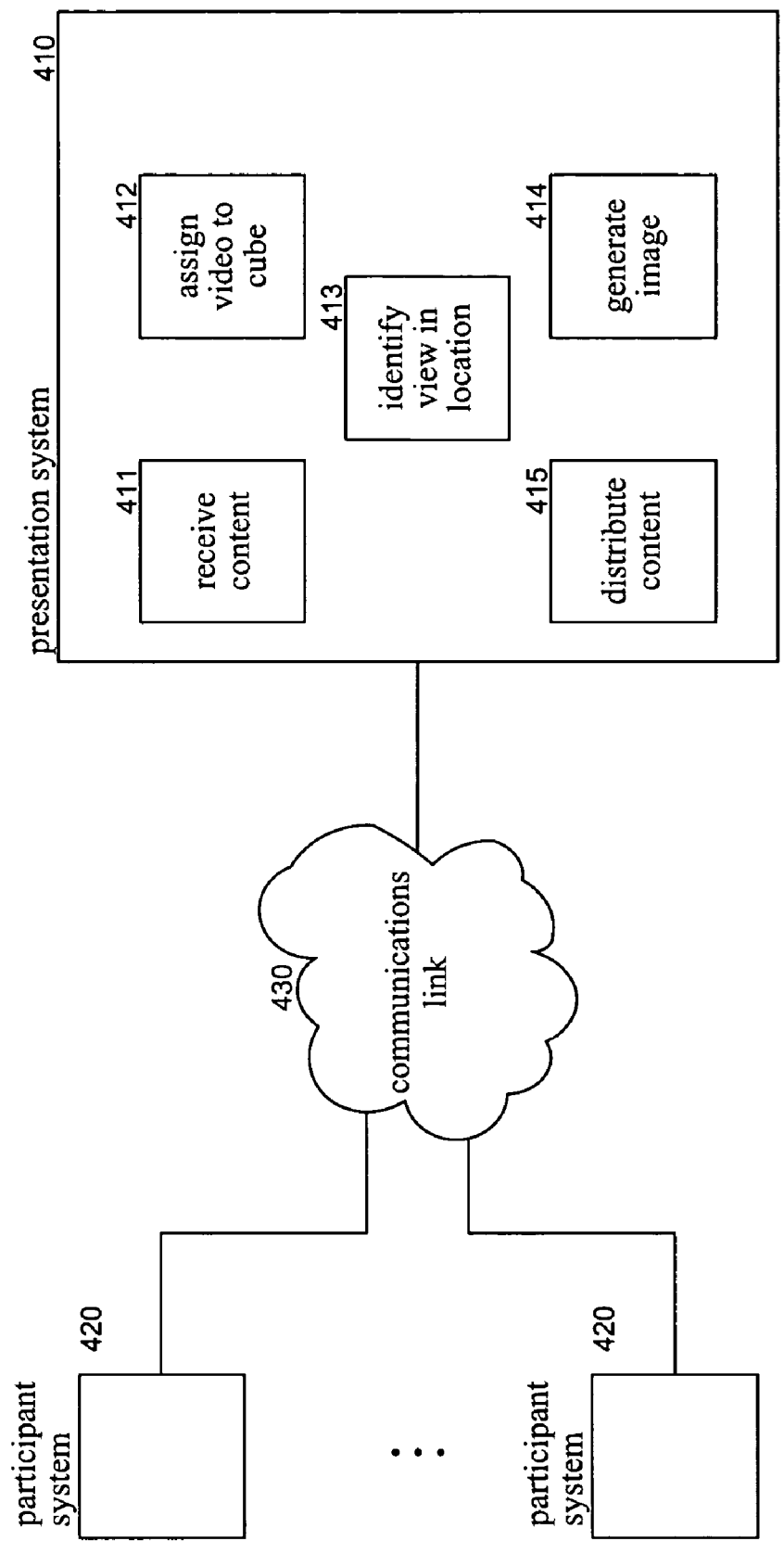
FIG. 4 is a block diagram that illustrates components of the presentation system implemented on a video conferencing server in one embodiment.

FIG. 4 is a block diagram that illustrates components of the presentation system implemented on a video conferencing server in one embodiment. In this embodiment, the presentation system 410 is implemented on a video conferencing server that receives live video streams of the conference participants from the participant computer systems 420 via communications link 430 in real time. The presentation system includes a receive content component 411, an assign video to cube component 412, an identify view location component 413, a generate image component 414, and a distribute content component 415. The receive content component receives the video and audio streams from each conference participant. The assign video to cube component assigns the video streams to different faces of the cube. One skilled in the art will appreciate that standard tools are available for assigning images to the faces of three-dimensional objects, which are referred to as 3D engines. The assign video to cube component may use these standard tools to repeatedly assign each frame of a video to a face of the cube. These standard tools can also be used to generate an image of a three-dimensional object from any view location. Once the identify view location component identifies a view location from which the cube is to be viewed, the generate image component uses the standard tools to generate the image. The distribute content component then distributes the generated image and the audio to the participant systems for display to the conference participants.

Figure 5:
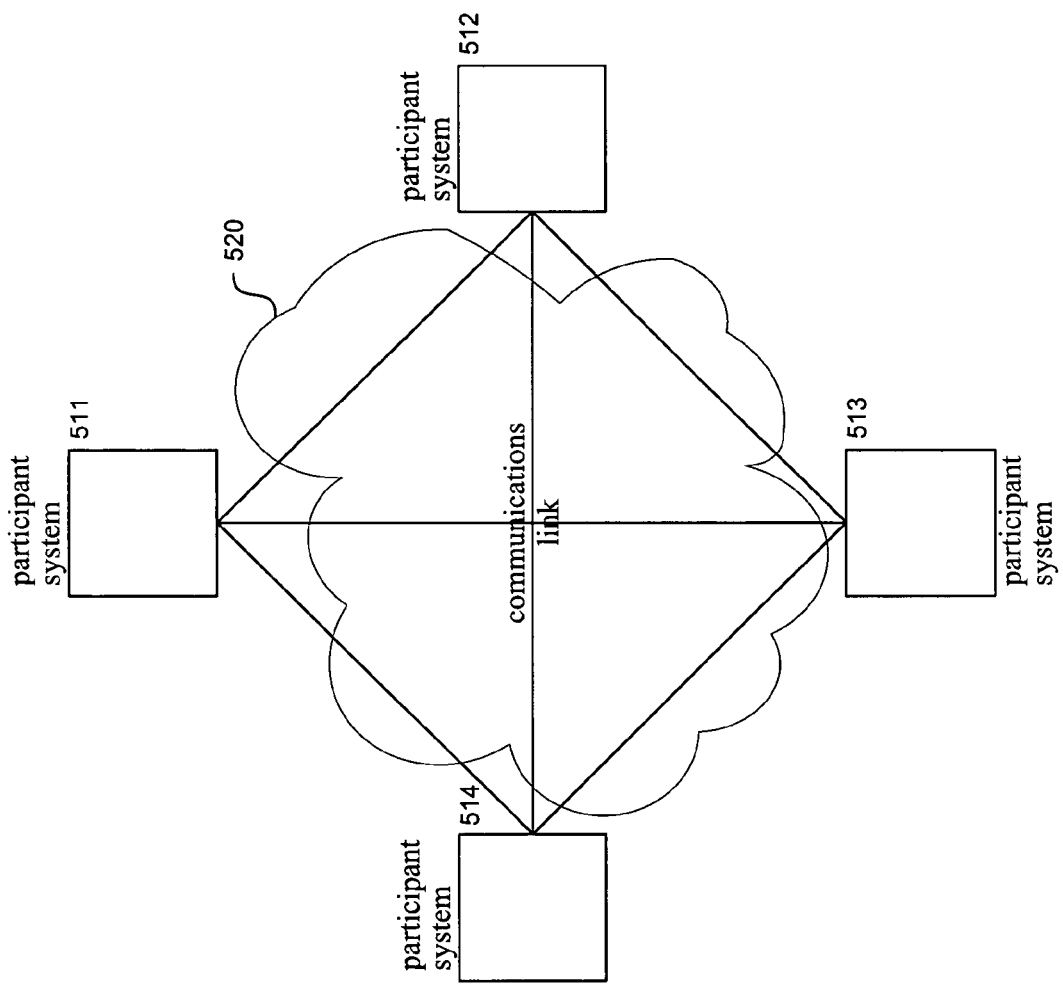
FIG. 5 is a block diagram that illustrates participant systems connected on a peer-to-peer basis in one embodiment.

FIG. 5 is a block diagram that illustrates participant systems connected on a peer-to-peer basis in one embodiment. Participant systems 511-514 are each connected to each other participant system via communications link 520. For example, participant system 511 has a connection to participant systems 512, 513, and 514. Participant system 512 has a connection to participant systems 511, 513, and 514. When the participant systems are connected on a peer-to-peer basis, each participant system has an implementation of the presentation system that can display the video of the conference participants on the faces of a cube. One skilled in the art will appreciate that a video conference may include some participant systems that are connected on a peer-to-peer basis and other conference participants who are connected via a video conferencing server.

Figure 6:
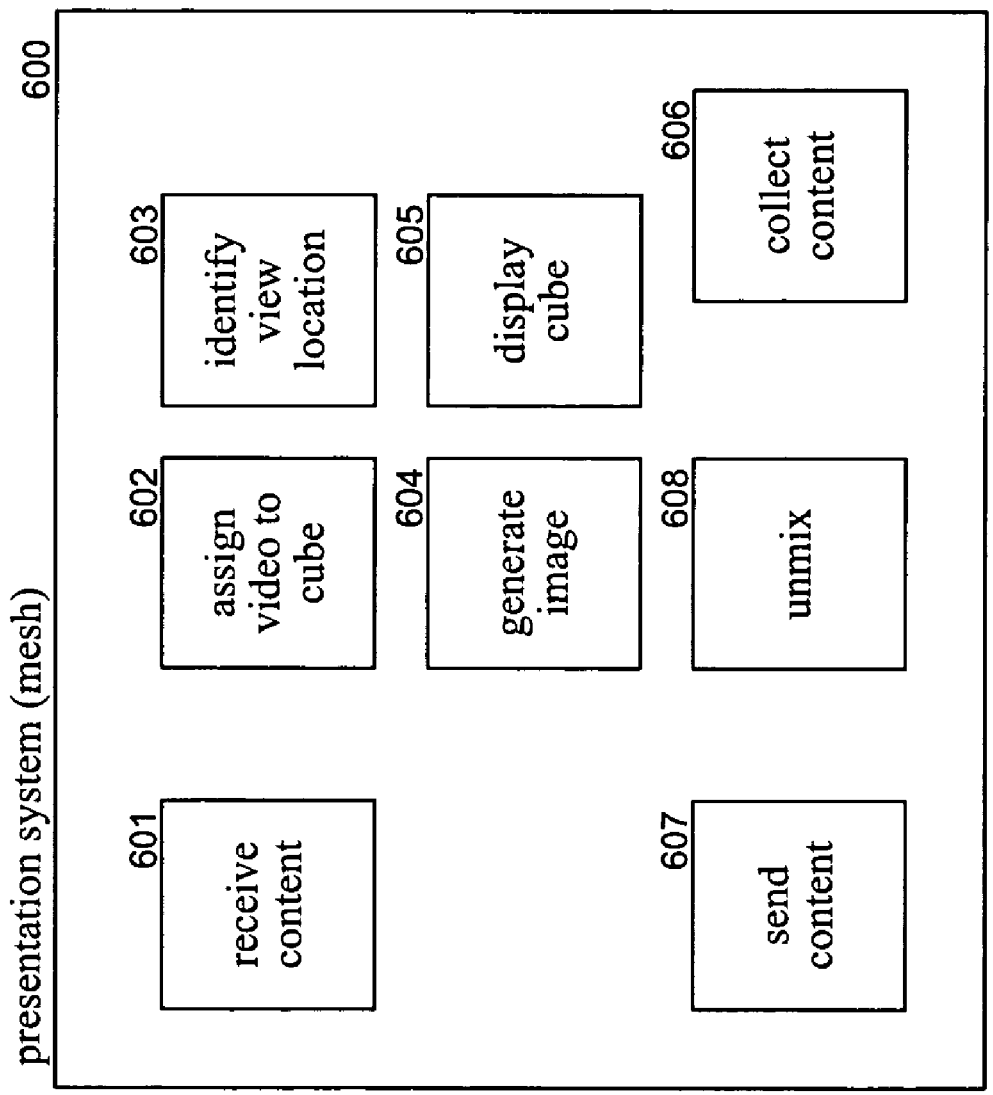
FIG. 6 is a block diagram that illustrates components of the presentation system of a participant system in one embodiment.

FIG. 6 is a block diagram that illustrates components of the presentation system of a participant system in one embodiment. The presentation system 600 includes a receive content component 601, an assign video to cube component 602, an identify view location component 603, a generate image component 604, a display cube component 605, a collect content component 606, a send content component 607, and an unmix component 608. The receive content component receives the video and audio from the participant systems of the other conference participants. The assign video to cube component, the identify view location component, and the generate image component provide functions similar to those corresponding components described with reference to FIG. 4. The identify view location component may, however, have the option to allow the conference participant who is viewing the conference to manually rotate the conference cube. The display cube component displays the generated images to the conference participant. The collect content component collects the audio content so that the identify view location component can be used to determine which video to display most prominently. The send content component transmits the video and audio content generated by the participant system to the participant systems of the other conference participants. The unmix component may be used when the content received by the participant system has already been mixed by a video conferencing server. In such a case, the unmix component can identify the various videos of the conference and then request the assign video to cube component to assign those videos to the faces of the cube.

The computing device on which the presentation system is implemented may include a central processing unit, memory, input devices (e.g., keyboard and pointing devices), output devices (e.g., display devices), and storage devices (e.g., disk drives). The memory and storage devices are computer-readable media that may contain instructions that implement the presentation system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the presentation system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The presentation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 7:
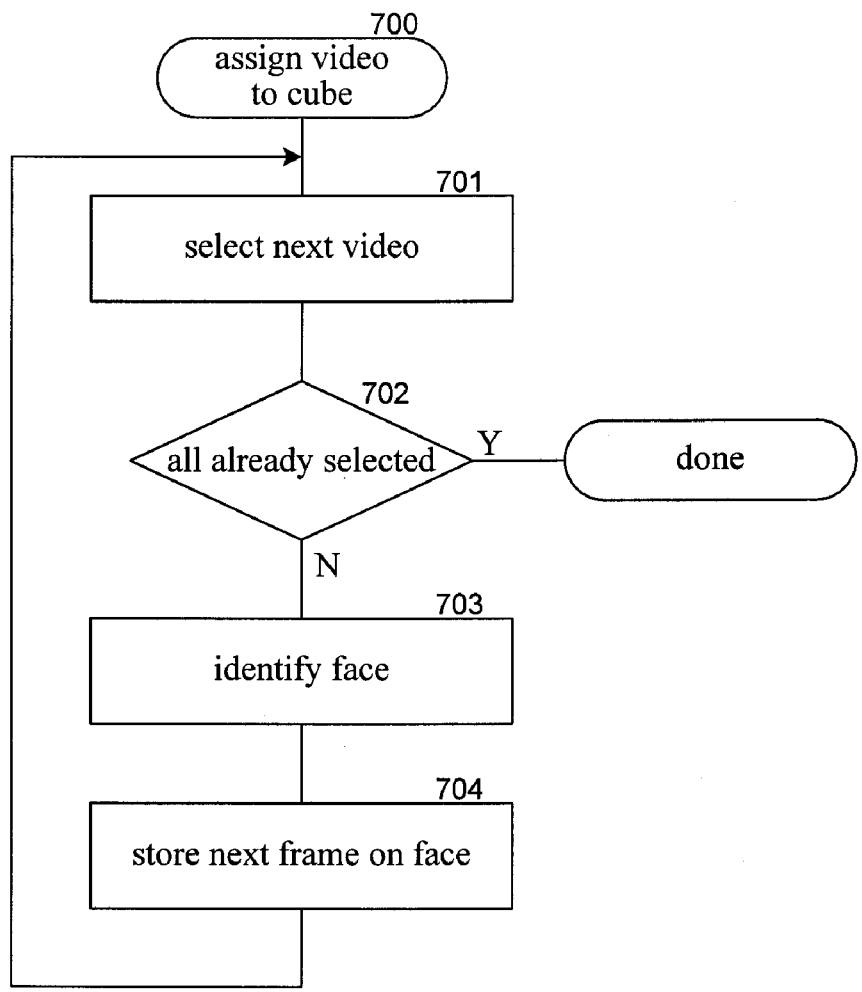
FIG. 7 is a flow diagram that illustrates the processing of the assign video to cube component of the presentation system in one embodiment.

FIG. 7 is a flow diagram that illustrates the processing of the assign video to cube component 700 of the presentation system in one embodiment. The component is invoked whenever a set of frames of the videos is ready to be presented. In block 701, the component selects the next video. In decision block 702, if all the videos have already been selected, then the component completes, else the component continues at block 703. In block 703, the component identifies the face of the cube on which to display the selected video. In the case of a cube, only three faces are visible at a time. Therefore, the component may only need to assign videos to the three faces. However, if a three-dimensional object with more or fewer faces is used, then the number of visible faces changes. For example, if the three-dimensional object is a dodecahedron, then six faces may be visible at a time. In block 704, the component stores the next frame on the identified face of the cube and then loops to block 701 to select the next video.

Figure 8:
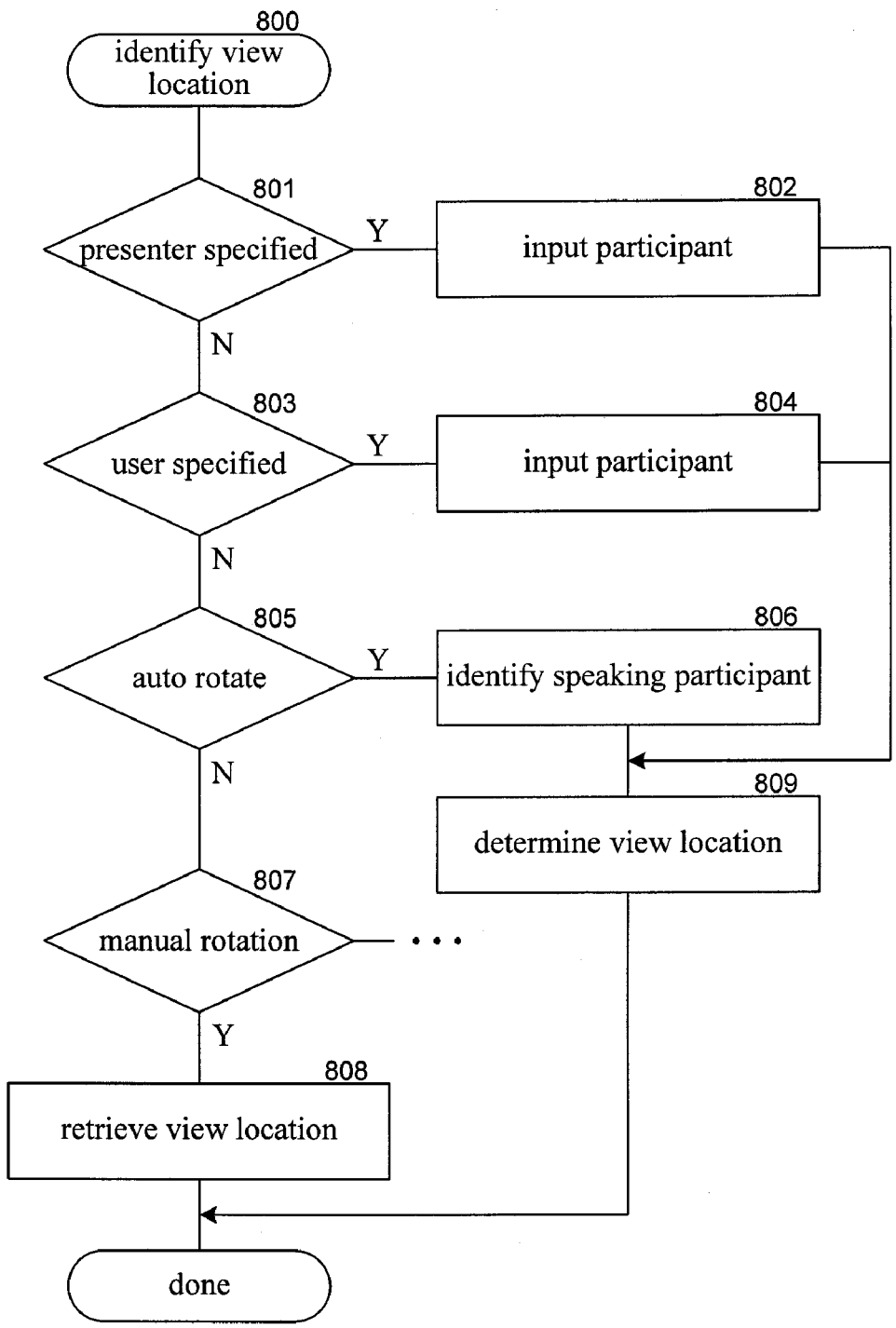
FIG. 8 is a flow diagram that illustrates the processing of the identify view location component of the presentation system in one embodiment.

FIG. 8 is a flow diagram that illustrates the processing of the identify view location component 800 of the presentation system in one embodiment. The component may use configuration information to control how to select the view location. For example, the component may automatically select the view location based on the conference participant that is currently speaking or based on input from a conference participant. In decision block 801, if the conference leader is to specify the view location, then the component continues at block 802, else the component continues at block 803. In block 802, the component inputs the view location information of the conference leader and then continues at block 809. In decision block 803, if the local conference participant is to specify the view location, then the component continues at block 804, else the component continues at block 805. In block 804, the component inputs the view location information from the local conference participant and then continues at block 809. In decision block 805, if the view location is to be automatically determined, then the component continues at block 806, else the component continues at block 807. In block 806, the component identifies the speaking conference participant and then continues at block 809. In decision block 807, if the view location is to be manually specified by the local conference participant, then the component continues at block 808. In block 808, the component retrieves the view location specified by the local conference participant and completes. In block 809, the component determines the view location and then completes.

Figure 9:
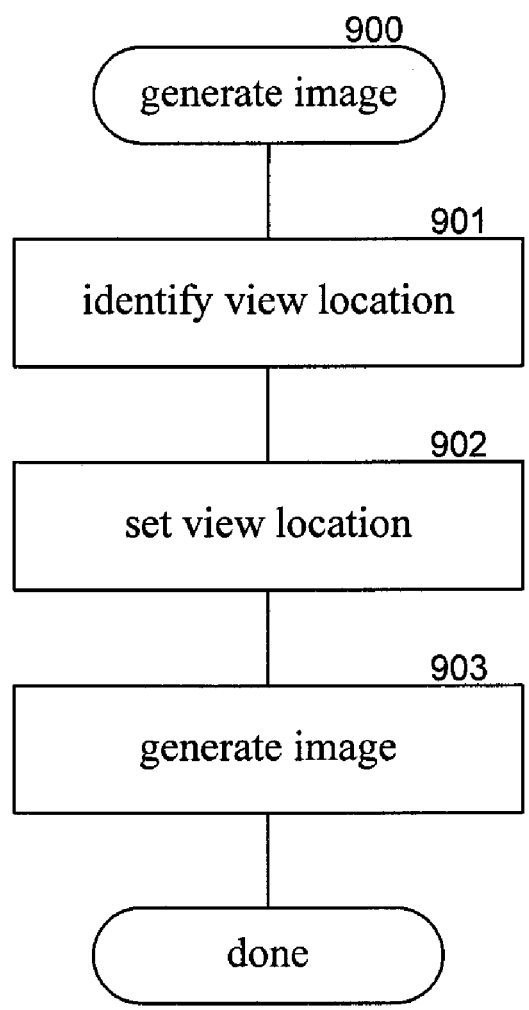
FIG. 9 is a flow diagram that illustrates the processing of the generate image component of the presentation system in one embodiment.

FIG. 9 is a flow diagram that illustrates the processing of the generate image component 900 of the presentation system in one embodiment. In block 901, the component identifies the view location. In block 902, the component sets the view location for the conference cube. In block 903, the component generates the image of the conference cube from the view location by invoking a 3D engine and then completes.

From the foregoing, it will be appreciated that specific embodiments of the presentation system have been described herein for purposes of illustration, but that various modifications may be made without deviating from the spirit and scope of the invention. One skilled in the art will appreciate that the presentation system can be used to display live videos on the faces of a three-dimensional object independently of a video conference. For example, different videos of a baseball game such as of a pitcher, batter, and runner can be displayed on the faces of a cube. A viewer may be allowed to select which video should be displayed prominently. Alternatively, the presentation system may select the video to display most prominently. For example, the video of the pitcher and batter may be displayed with equal prominence and the video of a base runner with lesser prominence. If the runner, however, starts to steal a base, then the presentation system can quickly rotate the three-dimensional object so that the video of the runner is most prominent. The presentation system may analyze the video and audio content to determine the activity of the video (e.g., stealing a base). Alternatively, a person viewing the baseball game can decide which video should be displayed prominently. Accordingly, the invention is not limited except as by the appended claims.

We claim:

1. A method in a computer system for presenting videos of a conference, the conference having videos of participants in the conference, the method comprising:

analyzing audio signals associated with the videos to determine participants who are currently engaged in a dialog, wherein each of the videos has an associated audio signal;

selecting to display prominently a video of a conference leader and videos of the participants who are currently engaged in a dialog and whose contributions to the dialog are not short utterances;

assigning the video selected of the conference leader and the videos selected of the participants to adjacent faces of a three-dimensional object;

identifying a view location from which to view the three-dimensional object, the view location being a location from which a face displaying the video selected of the conference leader and faces displaying the videos selected of the participants are prominently displayed;

generating an image of the three-dimensional object from the identified view location with the assigned video selected of the conference leader and videos selected of the participants displayed on the adjacent faces of the three-dimensional object; and changing the view location so that a face depicting a video of a new participant is prominently displayed when the new participant begins speaking, unless a contribution of the new participant is a short utterance, while continuing to prominently display the face displaying the video selected of the conference leader, wherein the view location does not change when a contribution of at least one of the participants or the new participant is a short utterance, which prevents rapid changes of videos that are prominently displayed;

wherein changing the view location includes reassigning the videos selected to faces of the three-dimensional object so that the face displaying the video selected of the conference leader is always visible and continues to be prominently displayed.

2. The method of claim 1 wherein a face is prominently displayed when the view location is in front of the face.

3. The method of claim 1 including:

receiving the videos of the participants in the conference; and sending the generated image to the computer system of a participant in the conference for display to the participant in the conference.

4. The method of claim 1 wherein the computer system is a computer system of a participant in the conference and including:

receiving videos of other participants in the conference; and displaying the generated image on a display device of the computer system of the participant in the conference.

5. The method of claim 1 wherein the three-dimensional object is a cube.

6. The method of claim 1, further comprising:
displaying a participants window, the participants window comprising a list of the participants in the conference; and
displaying a speaking icon in the participants window in association with a currently speaking participant.

7. The method of claim 1 wherein the conference leader specifies the view location.

8. A computer-readable medium containing instructions for controlling a computer system to present multiple live videos, the instructions implementing a method comprising:
analyzing audio signals associated with the videos to determine participants who are currently engaged in a dialog, wherein each of the videos has an associated audio signal;
selecting to display prominently videos of participants who are currently engaged in a dialog and whose contributions to the dialog are not short utterances, including determining one of the videos selected to display most prominently;
assigning the videos selected to adjacent faces of a three-dimensional object;
receiving from a user an indication of a view angle at which to view the video determined to be most prominently displayed;
generating an image of the three-dimensional object so that multiple videos on the faces of the three-dimensional object are visible within the image with the videos selected being displayed more prominently than other videos within the image and the video determined being displayed most prominently at the view angle received from the user; and
switching the videos that are prominently displayed so that a face depicting a video of the new participant is prominently displayed at the view angle received from the user when a new participant begins speaking, unless a contribution of the new participant is a short utterance, wherein the three-dimensional object is automatically rotated when switching a video that is to be prominently displayed;
wherein the view location does not change when a contribution of at least one of the participants or the new participant is a short utterance, which prevents rapid changes of videos that are prominently displayed;
wherein switching the view location includes reassigning the videos selected to faces of the three-dimensional object so that videos associated with participants currently engaged in dialog are assigned to adjacent faces.

9. The computer-readable medium of claim 8 wherein the method further comprises:
displayed a participants window, the participants window comprises a list of participants; and
displaying a speaking icon the participants window in association with a currently speaking participant.

10. A computer system for presenting multiple live videos of a baseball game, the computer system comprising:
a central processing unit;
a component that receives live videos;
a component that generates an image of a three-dimensional object with multiple live videos of the baseball game displayed on faces of the three-dimensional object within the image, wherein live videos of a pitcher, a batter, and a base runner are assigned to adjacent faces of the three-dimensional object, wherein the faces assigned the live videos of the pitcher and the batter are displayed with equal prominence within the image, and wherein a face assigned the live video of the base runner is displayed with less prominence within the image;
a component that analyzes video and audio content of the baseball game to determine an activity of the baseball game, wherein the activity includes the base runner stealing a base; and
a component that changes the videos that are displayed prominently within the image by rotating the three-dimensional object so that the face depicting the video of the base runner is more prominently displayed when the base runner begins to steal a base, so that videos of the baseball game currently with activity are most prominently displayed;
wherein the changes to the videos that are displayed includes reassigning the videos to adjacent faces of the three-dimensional object if the videos are not assigned to adjacent faces.

11. The computer system of claim 10 wherein the computer system is a multipoint control unit.

* * * * *